United States Patent
Koiso

(10) Patent No.: US 10,364,956 B2
(45) Date of Patent: Jul. 30, 2019

(54) HEADLIGHT DEVICE, HEADLIGHT CONTROLLING METHOD, AND HEADLIGHT CONTROLLING PROGRAM

(71) Applicant: JVC KENWOOD Corporation, Yokohama-shi, Kanagawa (JP)

(72) Inventor: Hisashi Koiso, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/982,000

(22) Filed: May 17, 2018

(65) Prior Publication Data

US 2018/0266643 A1    Sep. 20, 2018

Related U.S. Application Data

(63) Continuation of application No. PCT/JP2016/074666, filed on Aug. 24, 2016.

(30) Foreign Application Priority Data

Nov. 30, 2015    (JP) .................................. 2015-233981

(51) Int. Cl.
*F21S 41/657* (2018.01)
*B60Q 1/14* (2006.01)
(Continued)

(52) U.S. Cl.
CPC .............. *F21S 41/657* (2018.01); *B60Q 1/14* (2013.01); *F21S 41/143* (2018.01);
(Continued)

(58) Field of Classification Search
CPC ..... B60R 1/00; B60R 11/04; B60R 2300/105; B60R 2300/8093; B60R 1/084;
(Continued)

(56) References Cited

U.S. PATENT DOCUMENTS

| 2004/0167697 A1 | 8/2004 | Albou et al. |
| 2009/0323366 A1 | 12/2009 | Furusawa |

(Continued)

FOREIGN PATENT DOCUMENTS

| JP | 6-144108 | 5/1994 |
| JP | 2004-189223 | 7/2004 |

(Continued)

OTHER PUBLICATIONS

International Search Report and Written Opinion for International Patent Application No. PCT/JP2016/074666 dated Nov. 8, 2016, 10 pages.

*Primary Examiner* — Monica C King

(74) *Attorney, Agent, or Firm* — Amin, Turocy & Watson LLP

(57) ABSTRACT

Provided is a headlight device which appropriately controls emission of light from a headlight of a traveling vehicle. A headlight device includes an image capturing unit, a vanishing point calculation unit, a headlight, and an emission control unit. The image capturing unit captures an image in a traveling direction of a traveling vehicle. The vanishing point calculation unit calculates a position of a vanishing point in the image, on the basis of an image captured by the image capturing unit. The headlight emits light in a traveling direction of the vehicle. The emission control unit controls emission of light from the headlight on the basis of a position of a vanishing point calculated by the vanishing point calculation unit.

9 Claims, 20 Drawing Sheets

(51) Int. Cl.
*F21S 41/675* (2018.01)
*F21S 41/143* (2018.01)
*F21S 41/148* (2018.01)
*G06K 9/00* (2006.01)
*F21Y 115/10* (2016.01)

(52) U.S. Cl.
CPC ........... *F21S 41/148* (2018.01); *F21S 41/675* (2018.01); *G06K 9/00798* (2013.01); *B60W 2420/42* (2013.01); *F21Y 2115/10* (2016.08)

(58) Field of Classification Search
CPC ........ B60R 2300/106; B60R 2300/304; B60R 2300/8033; B60R 2300/804; B60R 2300/8053; B60R 2001/1253; B60R 2300/802; B60R 11/02; B60R 11/0229; B60R 16/0231; B60R 16/0315; B60R 1/04; B60R 1/06; B60R 1/083; B60R 1/085; B60R 1/1207; B60R 2001/1215; B60R 2001/1223; B60R 2011/004; B60R 21/00; B60R 2300/102; B60R 2300/103; B60R 2300/108; B60R 2300/30; B60R 2300/307; B60R 2300/607; B60R 2300/8026; B60R 2300/8066; G08G 1/167; G08G 1/166; G08G 1/00; G08G 1/0175; G08G 1/09623; G08G 1/09626; G08G 1/16; G08G 1/165; G08G 1/04; G08G 1/052; G08G 1/056; G08G 1/095; G08G 1/096827; G08G 1/096833; G08G 1/162; G08G 1/163; F21S 41/645; F21S 41/147; F21S 41/675; F21S 41/155; F21S 41/25; F21S 41/36; F21S 41/365; F21S 41/37; F21S 41/62; F21S 8/04; F21S 41/143; F21S 41/43; F21S 41/657; F21S 41/141; F21S 41/148; F21S 41/255; F21S 41/285; F21S 41/30; F21S 41/321; F21S 41/64; F21S 41/663; F21S 41/686; G02B 26/005; G02B 5/0808; G02B 6/001; G02B 6/3538; G02B 2027/014; G02B 5/128; G02B 2027/0178; G02B 2027/0187; G02B 27/0012; G02B 27/017; G02B 5/223; G02B 5/23; G02B 5/286; G02B 2027/0138; G02B 2027/0141; G02B 27/01; G02B 27/0101; G02B 27/106; G02B 5/124
See application file for complete search history.

(56) References Cited

U.S. PATENT DOCUMENTS

2010/0134011 A1* 6/2010 Kobayashi ............ B60Q 1/085
                                                    315/82
2014/0029792 A1   1/2014 Kato et al.

FOREIGN PATENT DOCUMENTS

| JP | 2009-67083 | 4/2009 |
| JP | 2010-006172 | 1/2010 |
| JP | 2010-132053 | 6/2010 |
| JP | 2014-24410 | 2/2014 |

* cited by examiner

HEADLIGHT DEVICE, HEADLIGHT CONTROLLING METHOD, AND HEADLIGHT CONTROLLING PROGRAM

CROSS-REFERENCE TO RELATED APPLICATION(S)

This application is a Continuation of PCT international application Ser. No. PCT/JP2016/074666 filed on Aug. 24, 2016 which designates the United States, incorporated herein by reference, and which claims the benefit of priority from Japanese Patent Application No. 2015-233981, filed on Nov. 30, 2015, incorporated herein by reference.

BACKGROUND

1. Technical Field

The present disclosure relates to a headlight device, a headlight controlling method, and a headlight controlling program.

2. Description of the Related Art

A headlight device for automatically turning on or off an automobile light is disclosed in Patent Literature 1 (Japanese Laid-open Patent Publication No. 2010-6172 A). The headlight device disclosed in Patent Literature 1 turns on or off a headlight on the basis of brightness in front of an own vehicle.

The headlight device disclosed in Patent Literature 1 is configured to turn on or off a headlight. Thus, there is room for improvement in controlling emission of light from a lit headlight in a traveling vehicle.

SUMMARY

It is an object of the present disclosure to at least partially solve the problems in the conventional technology.

A headlight device according to one aspect includes an image capturing unit configured to capture an image in a traveling direction of a traveling vehicle, a vanishing point calculation unit configured to calculate, on the basis of an image captured by the image capturing unit, a position of a vanishing point in the image, a pair of headlights provided on a left side and a right side of a front portion of the vehicle and configured to emit light in a traveling direction of the vehicle, and an emission control unit configured to control emission of light from the headlight such that lights from the pair of headlights are emitted to overlap each other at a position of a vanishing point on the basis of the position of a vanishing point calculated by the vanishing point calculation unit and a height of a range of illumination from a headlight positioned on an opposite side from the position of a vanishing point with respect to a horizontal center in the image is decreased.

A headlight controlling method according to one aspect includes steps of emitting light in a traveling direction of a traveling vehicle, capturing an image in a traveling direction of the vehicle, calculating, on the basis of the captured image, a position of a vanishing point in the image, and controlling the emission of light from the headlight such that lights from the pair of headlights provided on a left side and a right side of a front portion of the vehicle are emitted to overlap each other at the position of a vanishing point on the basis of the position of a vanishing point and a height of a range of illumination from a headlight positioned on an opposite side from the position of a vanishing point with respect to a horizontal center in the image is decreased.

A non-transitory storage medium storing therein a headlight controlling program according to one aspect is disclosed. The headlight controlling program causes a computer to achieve a function of capturing an image in a traveling direction of a traveling vehicle, a function of calculating, on the basis of the captured image, a position of a vanishing point in the image, and a function of controlling emission of light from a headlight such that lights from the pair of headlights provided on a left side and a right side of a front portion of the vehicle are emitted to overlap each other at the position of a vanishing point on the basis of the calculated position of a vanishing point and a height of a range of illumination from a headlight positioned on an opposite side from the position of a vanishing point with respect to a horizontal center in the image is decreased.

DETAILED DESCRIPTION

Hereinafter, examples of a headlight device according to the present disclosure will be described in detail with reference to the drawings. It should be noted that the present disclosure is not limited to the examples. Furthermore, component elements of the embodiments include component elements which can be replaced and obviously replaced by equivalents while maintaining the identity of the disclosure. Furthermore, a plurality of modifications of the embodiments can be appropriately combined with each other within a range apparent to those skilled in the art.

(Headlight Device)

Figure 1:
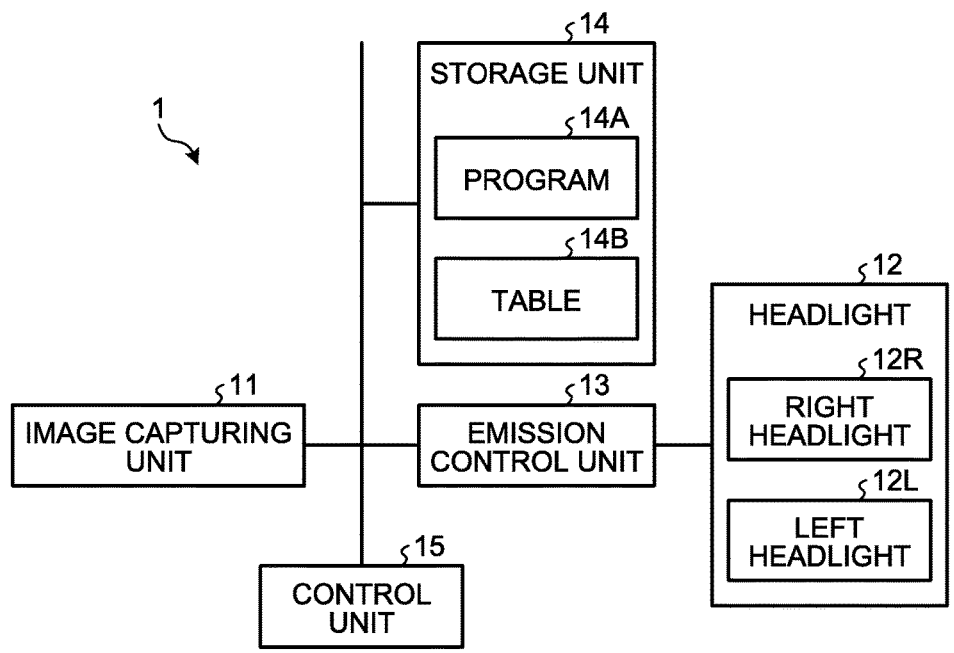
FIG. 1 is a block diagram illustrating a functional configuration of a headlight device according to an embodiment of the present disclosure.

FIG. 1 is a block diagram illustrating a functional configuration of a headlight device according to the present example. As illustrated in FIG. 1, the headlight device 1 according to the present example includes an image capturing unit 11, a headlight 12, an emission control unit 13, a storage unit 14, and a control unit 15.

During travel of a vehicle, the image capturing unit 11 captures an image of a view in a traveling direction of the vehicle. The image capturing unit 11 is, for example, an in-vehicle camera which is mounted near an upper portion of a windshield. For the image capturing unit 11, an infrared camera may be employed.

The headlight 12 includes a right headlight 12R and a left headlight 12L. The right headlight 12R is provided on the right side of a front portion of the vehicle. The right headlight 12R emits light forward from the right side of the vehicle. The left headlight 12L is provided on the left side of the front portion of the vehicle. The left headlight 12L emits light forward from the left side of the vehicle.

The emission control unit 13 controls emission of light from the headlight 12 in accordance with a position of a vanishing point. The vanishing point represents a point to which a parallel line group converges in a three-dimensional space shown in an image. The emission control unit 13 controls the direction of an axis of light, that is, an optical axis of the headlight 12, in accordance with the position of a vanishing point. The emission control unit 13 controls the optical axis of the headlight 12 in at least one of up, down, right, and left directions, for emission of light from the headlight 12 to the position of a vanishing point.

The emission control unit 13 desirably controls the direction of the optical axis not in real time but at approximately several hundred millisecond intervals. Such a configuration provides a stable field of view to a driver without frequently changing the direction of light from the headlight 12, even if a road surface on which the vehicle travels has a slight roughness thereon.

The storage unit 14 stores information required for operation of the headlight device 1. The storage unit 14 stores a program 14A and a table 14B. The program 14A is a program for controlling the respective units of the headlight device 1. The program 14A is executed by the control unit 15. The table 14B associates a position of a vanishing point with a content for controlling the headlight 12. The content for controlling the headlight 12 includes, for example, data for operating an actuator, data representing a position of a lamp to be turned on when the headlight 12 includes a plurality of lamps, or data representing a position of a vanishing point and a range in which a laser light source is turned on. The control unit 15 and the emission control unit 13 are allowed to refer to the contents of the table 14B.

Furthermore, the storage unit 14 functions as a frame memory for storing an image captured by the image capturing unit 11.

The control unit 15 includes, for example, a central processing unit (CPU). The control unit 15 executes the program 14A to calculate the vanishing point. Furthermore, the control unit 15 controls the respective units of the headlight device 1.

Next, the operation of the headlight device 1 is described. The image capturing unit 11 captures an image of a view in the traveling direction of the vehicle. On the basis of the image captured by the image capturing unit 11, the control unit 15 calculates a vanishing point. The control unit 15 transmits data relating to the position of a vanishing point to the emission control unit 13. For example, the control unit 15 transmits coordinate values of a vanishing point to the emission control unit 13.

The emission control unit 13 receives the data relating to the position of a vanishing point from the control unit 15. On the basis of the data relating to the position of a vanishing point, the emission control unit 13 refers to the table 14B to obtain, for example, data for operating an actuator, and controls emission of light from the headlight 12. The emission control unit 13 controls emission of light from the headlight 12 such that light is emitted to the position of a vanishing point. That is, the emission control unit 13 controls an optical axis of the right headlight 12R and an optical axis of the left headlight 12L for emission of light from the headlights to the position of a vanishing point.

(Headlight Controlling Method)

Figure 2:
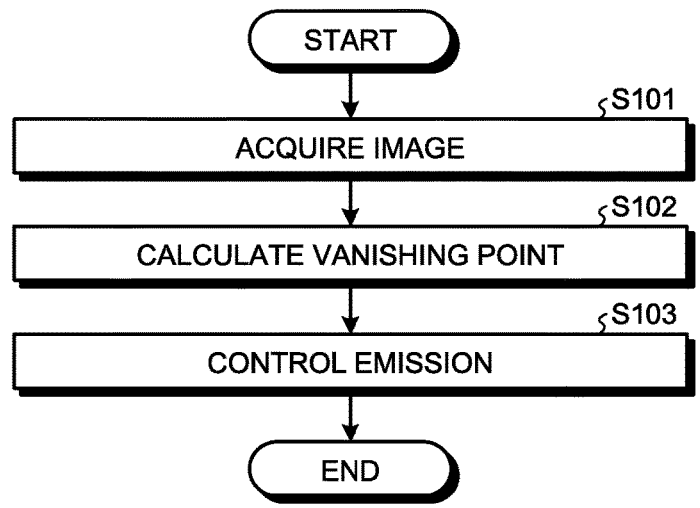
FIG. 2 is a flowchart illustrating an example of a headlight controlling method for controlling a headlight by the operation of a headlight device according to the embodiment.

FIG. 2 is a flowchart illustrating an example of a headlight controlling method for controlling a headlight by the operation of the headlight device according to the present example. The process of FIG. 2 is performed on condition that the headlight is turned on.

The control unit 15 acquires an image while the headlight is turned on (Step S101). On the basis of the acquired image, the control unit 15 calculates a vanishing point (Step S102). On the basis of the calculated position of a vanishing point, the emission control unit 13 controls emission of light from the headlight (Step S103).

The above method may be performed by the operation of the control unit 15 and the emission control unit 13. Furthermore, when the control unit 15 includes the function of the emission control unit 13, the above method may be performed by the control unit 15 executing the program 14A.

(Example of Headlight)

Figure 3:
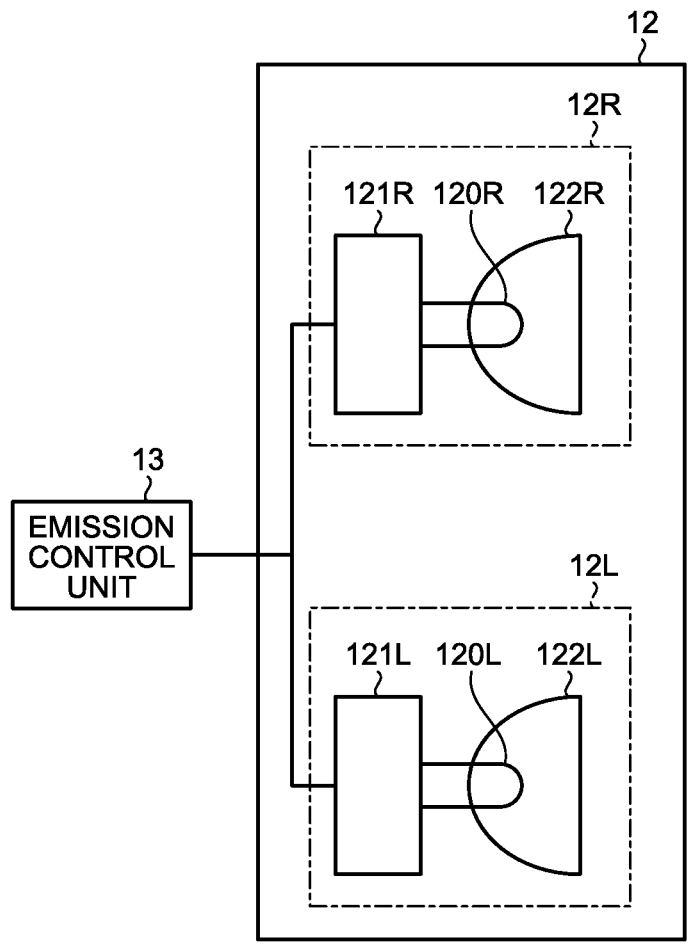
FIG. 3 is a diagram illustrating an exemplary configuration of a headlight.

FIG. 3 is a diagram illustrating an exemplary configuration of the headlight 12. The right headlight 12R includes a light source unit 120R, a reflector 122R, and an actuator 121R. The left headlight 12L includes a light source unit 120L, a reflector 122L, and an actuator 121L. The light source unit 120R and the light source unit 120L include, for example, a xenon lamp or a light emitting diode (LED) lamp. The reflector 122R reflects light emitted from the light source unit 120R in the traveling direction of the vehicle. The reflector 122L reflects light emitted from the light source unit 120L in the traveling direction of the vehicle.

The actuator 121R and the actuator 121L are each formed as a change/drive unit for changing the direction of the optical axis. The actuator 121R and the actuator 121L include, for example, a biaxial actuator. The actuator 121R moves the position of the light source unit 120R in two directions of an x-axis direction (direction parallel to a road surface) and a y-axis direction (direction perpendicular to the road surface). The actuator 121R can change the position of the light source unit 120R relative to the reflector 122R to control a light emitting position. The actuator 121L moves the position of the light source unit 120L in two directions of an x-axis direction (direction parallel to a road surface) and a y-axis direction (direction perpendicular to the road surface). The actuator 121L can change the position of the light source unit 120L relative to the reflector 122L to control a light emitting position.

Next, operation of the headlight 12 is described. The emission control unit 13 controls the actuator 121R and the actuator 121L on the basis of data relating to the position of a vanishing point. The emission control unit 13 acquires a content for controlling the headlight 12 corresponding to the position of a vanishing point, with reference to the table 14B. For example, the emission control unit 13 acquires data for operating the actuator 121R and the actuator 121L.

On the basis of a content for controlling acquired from the table 14B, the emission control unit 13 operates the actuator 121R and the actuator 121L. When the actuator 121R is operated, the position of the light source unit 120R relative to the reflector 122R changes, and the light emitting position of the light source unit 120R changes. When the actuator 121L is operated, the position of the light source unit 120L relative to the reflector 122L changes, and the light emitting position of the light source unit 120L changes. The above configuration controls the emission of light from the headlight 12 on the basis of the position of a vanishing point, and light is emitted to the position of a vanishing point.

FIGS. 4 to 8 are diagrams illustrating positions of vanishing points 20 and ranges of illumination from the headlight 12 in images 40 obtained by capturing views in front of the traveling vehicle by the in-vehicle camera.

Figure 4:
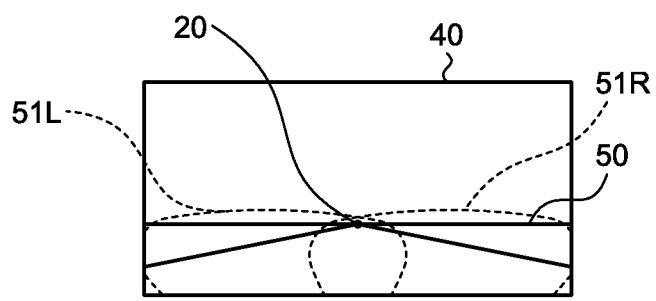
FIG. 4 is a diagram illustrating a position of a vanishing point and ranges of illumination from headlights in an image obtained by capturing a view in front of a traveling vehicle by an in-vehicle camera.

As illustrated in FIG. 4, when the vehicle travels along a straight road, which is not an uphill road or downhill road and does not turn right or left, a vanishing point 20 is positioned near a horizon 50, near the center of an image 40. The emission control unit 13 controls the right headlight 12R and the left headlight 12L so that a range 51R of illumination from the right headlight 12R and a range 51L of illumination from the left headlight 12L overlap each other near the vanishing point 20.

Figure 5:
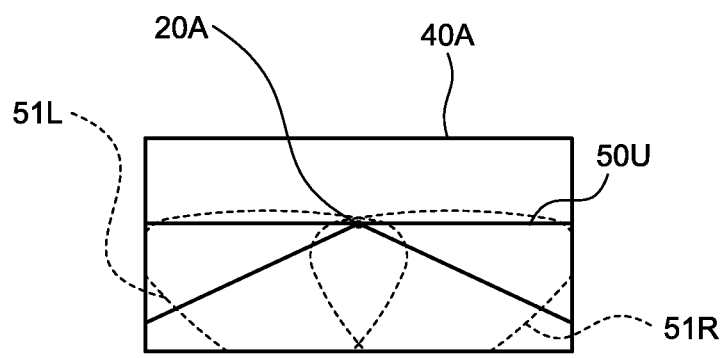
FIG. 5 is a diagram illustrating a position of a vanishing point and ranges of illumination from the headlights in an image obtained by capturing a view in front of the traveling vehicle by the in-vehicle camera.

FIG. 5 is a diagram illustrating traveling of the vehicle on an uphill road. As illustrated in FIG. 5, when the traveling vehicle approaches an uphill road, which does not turn right or left, the position of a horizon 50U is displaced upward. In this situation, a vanishing point 20A is positioned slightly above the center point of an image 40A. The emission control unit 13 controls the optical axes of the right headlight 12R and the left headlight 12L upward relative to those of the right headlight 12R and the left headlight 12L in FIG. 4 so that the range 51R of illumination from the right headlight 12R and the range 51L of illumination from the left headlight 12L overlap each other near the vanishing point 20A. Thus, the optical axes of the right headlight 12R and the left headlight 12L are directed upward for appropriate emission of light in the traveling direction of the vehicle. Accordingly, light is not so bright to an oncoming car, the range of illumination from the headlight 12 can be dynamically adjusted, and an optimal field of view can be provided to the driver.

Figure 6:
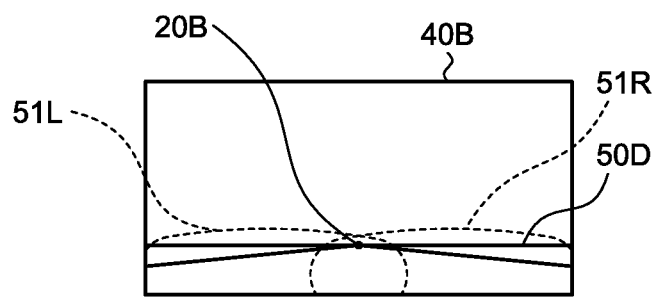
FIG. 6 is a diagram illustrating a position of a vanishing point and ranges of illumination from the headlights in an image obtained by capturing a view in front of the traveling vehicle by the in-vehicle camera.

FIG. 6 is a diagram illustrating traveling of the vehicle on a downhill road. As illustrated in FIG. 6, when the traveling vehicle approaches a downhill road, which does not turn right or left, the position of a horizon 50D is displaced downward. In this situation, a vanishing point 20B is positioned slightly below the center point of an image 40B. The emission control unit 13 controls the optical axes of the right headlight 12R and the left headlight 12L downward relative to those of the right headlight 12R and the left headlight 12L in FIG. 4 so that the range 51R of illumination from the right headlight 12R and the range 51L of illumination from the left headlight 12L overlap each other near the vanishing point 20B. Thus, the optical axes of the right headlight 12R and the left headlight 12L are directed downward for appropriate emission of light in the traveling direction of the vehicle without unnecessary emission of light to an unnecessary portion. Accordingly, light is not so bright to an oncoming car, the range of illumination from the headlight 12 can be dynamically adjusted, and an optimal field of view can be provided to the driver.

Figure 7:
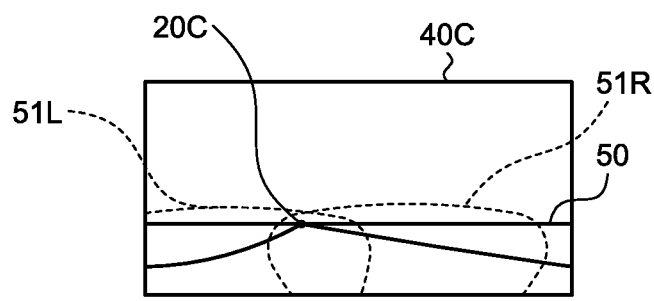
FIG. 7 is a diagram illustrating a position of a vanishing point and ranges of illumination from the headlights in an image obtained by capturing a view in front of the traveling vehicle by the in-vehicle camera.

FIG. 7 is a diagram illustrating traveling of the vehicle through a left-hand curve. As illustrated in FIG. 7, when the vehicle travels through a left-hand curve, which is not an uphill road or downhill road, the position of the horizon 50 is not displaced. In this situation, a vanishing point 20C is positioned slightly on the left side relative to the center of an image 40C. The emission control unit 13 controls the optical axes of the right headlight 12R and the left headlight 12L leftward relative to those of the right headlight 12R and the left headlight 12L in FIG. 4 so that the range 51R of illumination from the right headlight 12R and the range 51L of illumination from the left headlight 12L overlap each other near the vanishing point 20C.

Figure 8:
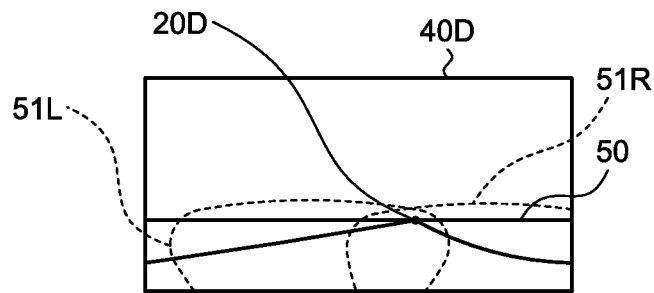
FIG. 8 is a diagram illustrating a position of a vanishing point and ranges of illumination from the headlights in an image obtained by capturing a view in front of the traveling vehicle by the in-vehicle camera.

FIG. 8 is a diagram illustrating traveling of the vehicle through a right-hand curve. As illustrated in FIG. 8, when the vehicle travels through a right-hand curve, which is not an uphill road or downhill road, the position of the horizon 50 is not displaced. In this situation, a vanishing point 20D is positioned slightly on the right side relative to the center of an image 40D. The emission control unit 13 controls the optical axes of the right headlight 12R and the left headlight 12L rightward relative to those of the right headlight 12R and the left headlight 12L in FIG. 4 so that the range 51R of illumination from the right headlight 12R and the range 51L of illumination from the left headlight 12L overlap each other near the vanishing point 20D.

Figure 9:
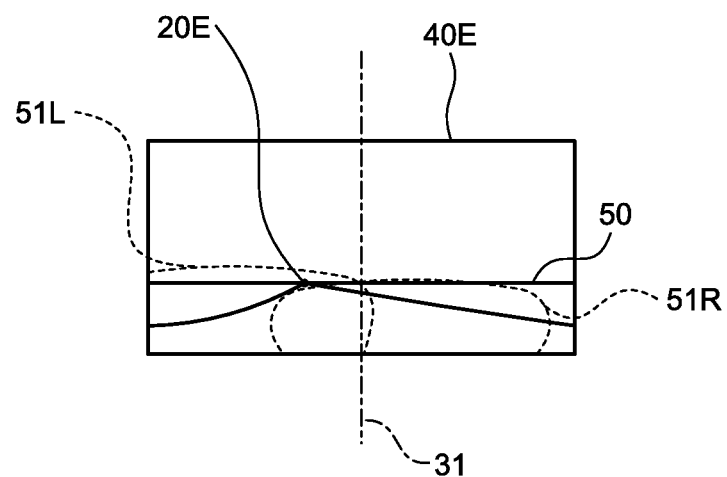
FIG. 9 is a diagram illustrating control for reducing the height of a range of illumination from a headlight positioned on the opposite side from a position of a vanishing point.
Figure 10:
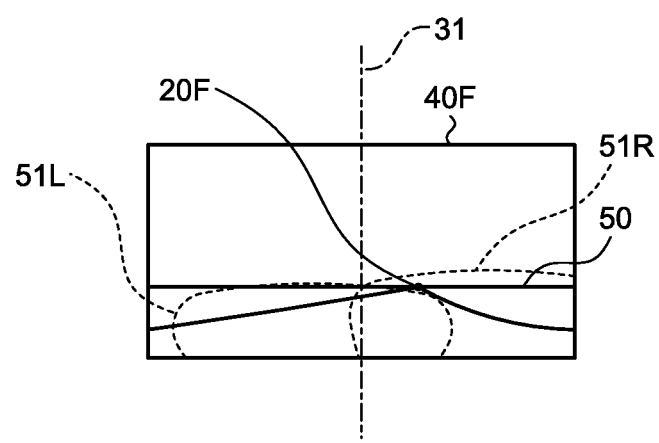
FIG. 10 is a diagram illustrating control for reducing the height of a range of illumination from a headlight positioned on the opposite side from a position of a vanishing point.

FIGS. 9 and 10 are diagrams each illustrating control for reducing the height of a range of illumination from a headlight positioned on the opposite side from a position of a vanishing point 20.

As illustrated in FIG. 9, when the vehicle travels through a left-hand curve, the emission control unit 13 controls the right headlight 12R and the left headlight 12L so that the range 51R of illumination from the right headlight 12R and the range 51L of illumination from the left headlight 12L overlap each other near a vanishing point 20E. Furthermore, since the vanishing point 20E is positioned on the left side from a line 31 indicating a horizontal center of an image 40E, the emission control unit 13 controls the range 51L of illumination from the left headlight 12L to have a height equal to that of the range 51L of illumination in FIG. 7, and controls the range 51R of illumination from the right headlight 12R to have a height smaller than that of the range 51R of illumination in FIG. 7. That is, the emission control unit 13 performs control to decrease a height of a range of illumination from a headlight positioned on the opposite side from the position of the vanishing point 20E with respect to the horizontal center in the image 40E. Since the range of illumination is determined as described above, light is illuminated in a direction (here, the left side on which the vanishing point 20E is positioned) in which the vehicle travels for ease of viewing, and in the opposite direction (here, the right side), excessive illumination of a pedestrian or the like in front of the vehicle on the outside of a road (here, the right side) can be prevented.

As illustrated in FIG. 10, when the vehicle travels through a right-hand curve, the emission control unit 13 controls the right headlight 12R and the left headlight 12L so that the range 51R of illumination from the right headlight 12R and the range 51L of illumination from the left headlight 12L overlap each other near a vanishing point 20F. Furthermore, since the vanishing point 20F is positioned on the right side from the line 31 indicating a horizontal center of an image 40F, the emission control unit 13 controls the range 51R of illumination from the right headlight 12R to have a height equal to that of the range 51R of illumination in FIG. 8, and controls the range 51L of illumination from the left headlight 12L to have a height smaller than that of the range 51L of illumination in FIG. 8. That is, the emission control unit 13 performs control to decrease a height of a range of illumination from a headlight positioned on the opposite side from the position of the vanishing point 20F with respect to the horizontal center in the image 40F. Since the range of illumination is determined as described above, light is illuminated in a direction in which the vehicle travels (here, the right side on which the vanishing point 20F is positioned) for ease of viewing, and in the other direction (here, the left side), excessive illumination of a pedestrian or the like in front of the vehicle on the outside of a road (here, the left side) can be prevented.

The ranges of illumination from the headlights may be restricted. For example, when the vehicle travels on an uphill road or the vehicle travels on a downhill road, each range of illumination may have an upper limit. Furthermore, for example, when the vehicle travels through a left-hand curve, each range of illumination may have a right limit, and when the vehicle travels through a right-hand curve, each range of illumination may have a left limit.

FIGS. 11 to 14 are diagrams illustrating control for restricting the ranges of illumination from the headlights.

Figure 11:
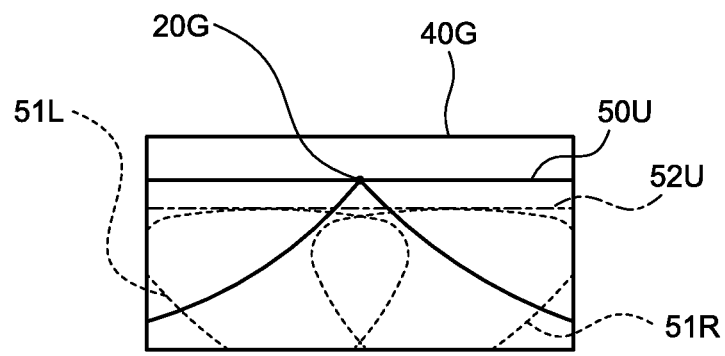
FIG. 11 is a diagram illustrating control for restricting ranges of illumination from headlights.
Figure 12:
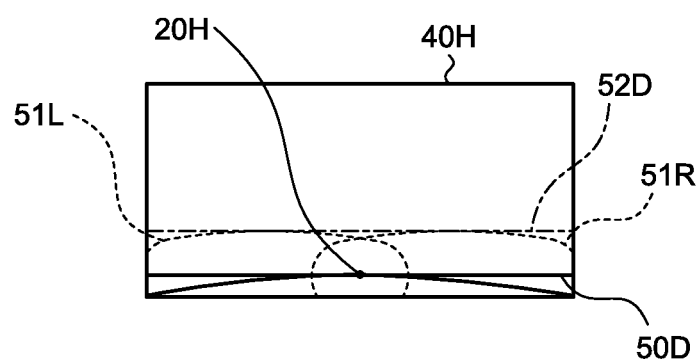
FIG. 12 is a diagram illustrating control for restricting ranges of illumination from the headlights.

As illustrated in FIG. 11, when the vehicle travels on an uphill road, which does not turn right or left, the position of a horizon 50U is displaced upward. In this situation, a vanishing point 20G is positioned above the center of an image 40G. When the vehicle travels on an uphill road, the emission control unit 13 may provide an upper limit 52U for the ranges of illumination to avoid excessive emission of light to a distance. Furthermore, as illustrated in FIG. 12, when the vehicle travels on a downhill road, which does not turn right or left, the position of a horizon 50D is displaced downward. In this situation, a vanishing point 20H is positioned below the center of an image 40H. When the vehicle travels on a downhill road, the emission control unit 13 may provide a lower limit 52D for the ranges of illumination to avoid emission of light only to the vicinity of the vehicle.

Figure 13:
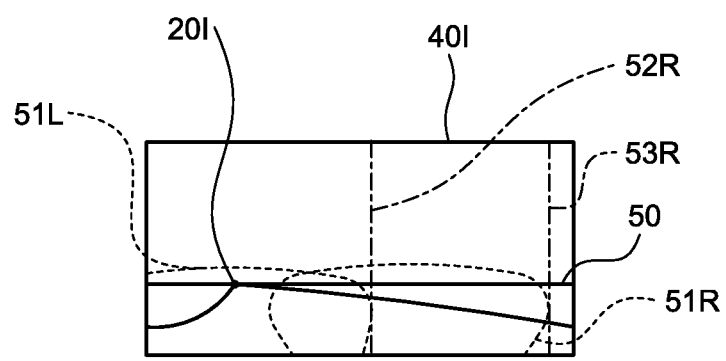
FIG. 13 is a diagram illustrating control for restricting ranges of illumination from the headlights.
Figure 14:
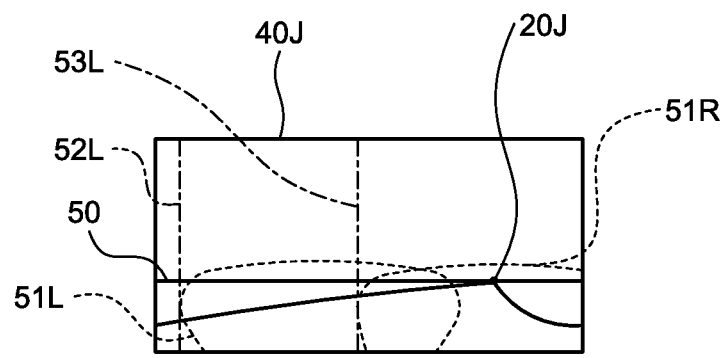
FIG. 14 is a diagram illustrating control for restricting ranges of illumination from the headlights.

Furthermore, as illustrated in FIG. 13, when the vehicle travels through a left-hand curve, the position of a vanishing point 20I may be closer to a left end of an image 40I. For this situation, the ranges of illumination have right limits 52R and 53R. That is, the range 51L of illumination from the left headlight 12L may be provided with the right limit 52R and the range 51R of illumination from the right headlight 12R may be provided with the right limit 53R to avoid excessive emission of light to the right side. Furthermore, as illustrated in FIG. 14, when the vehicle travels through a right-hand curve, the position of a vanishing point 20J may be closer to a right end of an image 40J. For this situation, the ranges of illumination have left limits 52L and 53L. That is, the range 51L of illumination from the left headlight 12L may be provided with the left limit 52L and the range 51R of illumination from the right headlight 12R may be provided with the left limit 53L to avoid excessive emission of light to the left side.

As described above, the ranges of illumination from the headlights are restricted to predetermined ranges, and extreme change in the directions of the optical axes of the headlights can be inhibited even if a vanishing point 20 has a large movement distance.

(Calculation of Position of Vanishing Point Based on Road Mark or the Like)

Here, a description is made of a method of calculating the position of a vanishing point on the basis of a road mark or a road installation.

The position of a vanishing point is calculated on the basis of a road mark or a road installation included in an image captured by the image capturing unit 11. The road mark includes a road center line, a road lane line, a road edge line, and a road shoulder. The road installation represents, for example, a guardrail.

Figure 15:
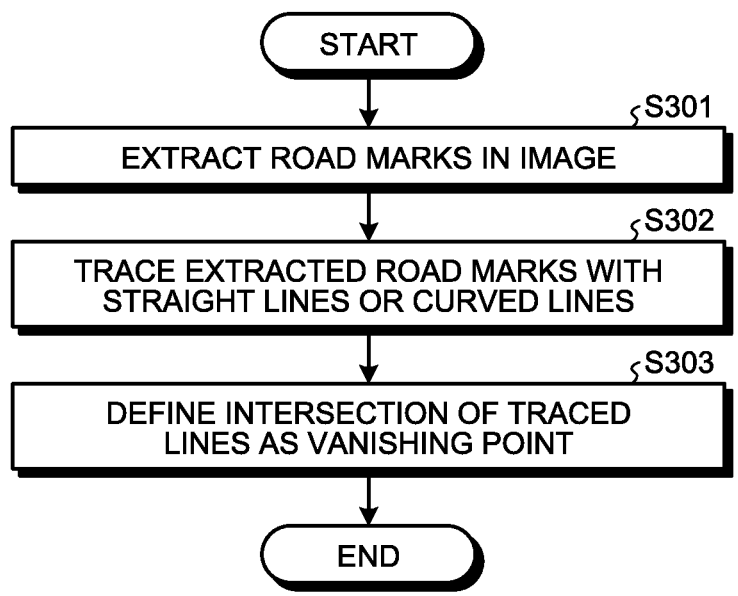
FIG. 15 is a flowchart illustrating a method of calculating a vanishing point on the basis of a road mark included in a captured image.

FIG. 15 is a flowchart illustrating a method of calculating a vanishing point on the basis of a road mark included in a captured image. In FIG. 15, firstly, road marks in an image are extracted (Step S301). Next, the road marks extracted in Step S301 are traced with straight lines or curved lines (Step S302). Then, an intersection of the lines which trace the road marks in Step S302 is defined as a vanishing point (Step S303).

(Example of Process of Calculating Vanishing Point)

Figure 16:
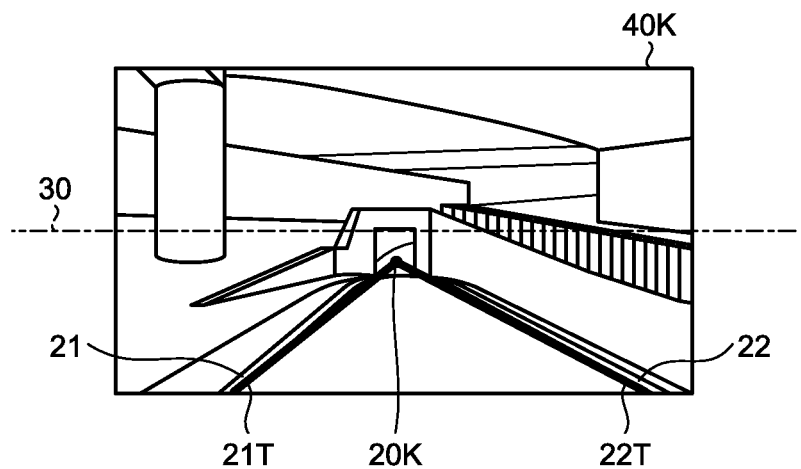
FIG. 16 is a diagram illustrating a process of calculating a position of a vanishing point on the basis of road marks.

FIGS. 16 to 19 are diagrams each illustrating a process of calculating a position of a vanishing point on the basis of road marks. FIG. 16 is a diagram illustrating an example of an image captured by the in-vehicle camera when the vehicle travels on a downhill road. As illustrated in FIG. 16, the image 40K includes road marks 21 and 22 provided on a road surface on which the vehicle travels.

Furthermore, in FIG. 16, the road marks 21 and 22 are extracted from the image 40K, and the road marks 21 and 22 are traced with straight lines 21T and 22T. Then, the intersection of the straight line 21T and the straight line 22T which trace the road marks 21 and 22 is defined as a vanishing point 20K.

Figure 17:
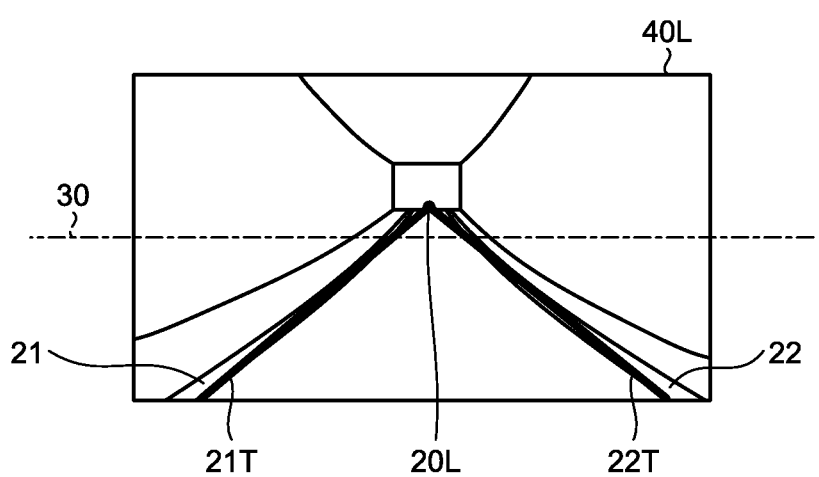
FIG. 17 is a diagram illustrating a process of calculating a position of a vanishing point on the basis of road marks.

FIG. 17 is a diagram illustrating an example of an image captured by the in-vehicle camera when the vehicle travels on an uphill road. As illustrated in FIG. 17, the image 40L includes road marks 21 and 22 provided on a road surface on which the vehicle travels.

Furthermore, in FIG. 17, the road marks 21 and 22 are extracted from the image 40L, and the road marks 21 and 22 are traced with straight lines 21T and 22T. Then, the intersection of the straight line 21T and the straight line 22T which trace the road marks 21 and 22 is defined as a vanishing point 20L.

Here, as illustrated in FIG. 16, when the vehicle travels on a downhill road, the position of the vanishing point 20K is often located below the position of a line 30 indicating a vertical center of the image. Furthermore, as illustrated in FIG. 17, when the vehicle travels on an uphill road, the position of the vanishing point 20L is often located above the position of the line 30 indicating a vertical center of the image 40L. As described above, the vanishing points 20K and 20L are different in vertical position between an uphill road and a downhill road on which the vehicle travels. Therefore, in the traveling vehicle, the vanishing points 20K and 20L are calculated, and on the basis of the calculated vanishing points 20K and 20L, emission of light from the headlight 12 is controlled.

Figure 18:
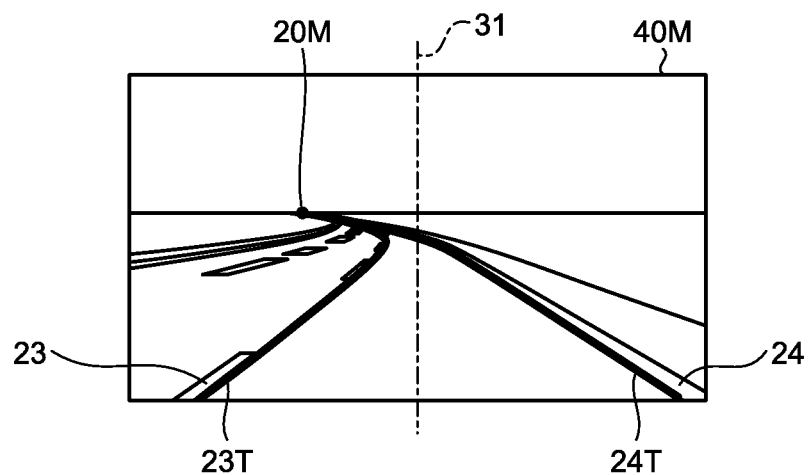
FIG. 18 is a diagram illustrating a process of calculating a position of a vanishing point on the basis of road marks.

FIG. 18 is a diagram illustrating an example of an image captured by the in-vehicle camera when the vehicle travels through a left-hand curve. As illustrated in FIG. 18, the image 40M includes road marks 23 and 24 provided on a road surface on which the vehicle travels.

Furthermore, in FIG. 18, the road marks 23 and 24 are extracted from the image 40M, and the road marks 23 and 24 are traced with curved lines 23T and 24T. Then, the intersection of the curved lines 23T and 24T which trace the road marks 23 and 24 is defined as a vanishing point 20M.

Figure 19:
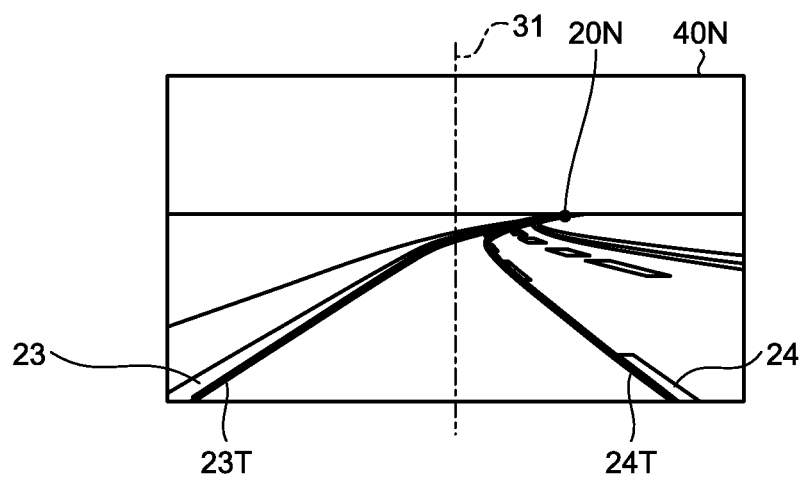
FIG. 19 is a diagram illustrating a process of calculating a position of a vanishing point on the basis of road marks.

FIG. 19 is a diagram illustrating an example of an image captured by the in-vehicle camera when the vehicle travels through a right-hand curve. As illustrated in FIG. 19, an image 40N includes road marks 23 and 24 provided on a road surface on which the vehicle travels.

Furthermore, in FIG. 19, the road marks 23 and 24 are extracted from the image 40N, and the road marks 23 and 24 are traced with curved lines 23T and 24T. Then, the intersection of the curved lines 23T and 24T which trace the road marks 23 and 24 is defined as a vanishing point 20N.

As illustrated in FIG. 18, when the vehicle travels through a left-hand curve, the position of the vanishing point 20M is often located on the left side from the position of the line 31 indicating a horizontal center of the image 40M. Furthermore, as illustrated in FIG. 19, when the vehicle travels through a right-hand curve, the position of the vanishing point 20N is often located on the right side from the position of the line 31 indicating a horizontal center of the image 40N. As described above, the vanishing points 20M and 20N are different in horizontal position between a left-hand curve and a right-hand curve through which the vehicle travels. Therefore, in the traveling vehicle, the vanishing points 20M and 20N are calculated, and on the basis of the calculated vanishing points 20M and 20N, emission of light from the headlight 12 is controlled.

As described above, an image in a direction in which the vehicle travels is captured, and on the basis of the image, the position of a vanishing point is calculated. Then, in accordance with the movement of the position of a vanishing point depending on the shape or the like of a road on which the vehicle travels, the optical axes of the headlights are adjusted to change the light emitting positions of the headlights.

(Calculation of Vanishing Point by Using Motion Vectors)

Figure 20:
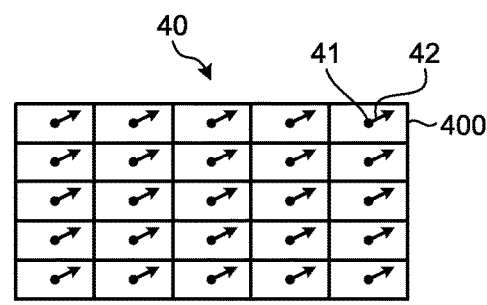
FIG. 20 is a diagram illustrating an exemplary process of calculating a vanishing point on the basis of motion vectors in an image captured by an image capturing unit.
Figure 21:
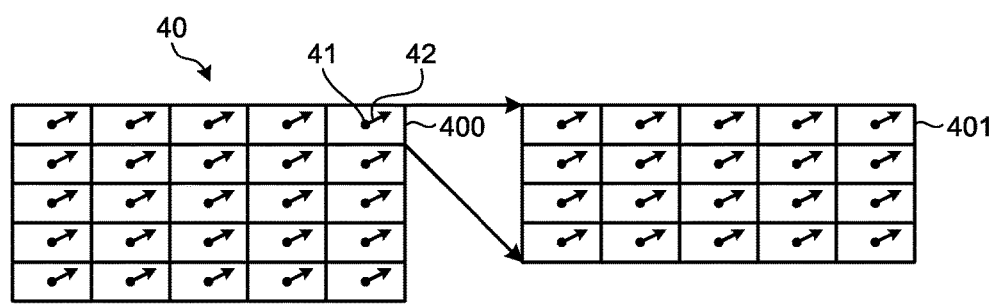
FIG. 21 is a diagram illustrating an exemplary process of calculating a vanishing point on the basis of motion vectors in the image captured by the image capturing unit.
Figure 22:
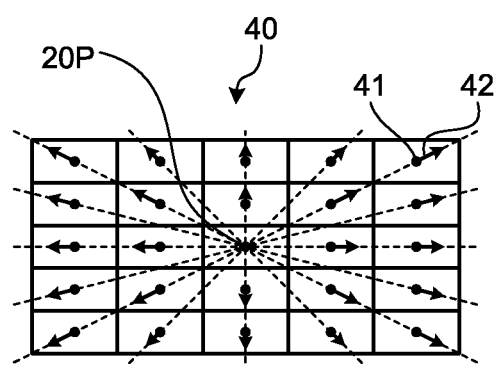
FIG. 22 is a diagram illustrating an exemplary process of calculating a vanishing point on the basis of motion vectors in an image captured by the image capturing unit.

The emission control unit 13 may calculate a vanishing point on the basis of motion vectors of an image captured by the image capturing unit 11. FIGS. 20 to 22 are diagrams each illustrating an example of calculation of a vanishing point on the basis of motion vectors of an image captured by the image capturing unit 11.

FIG. 20 is a diagram illustrating a state in which a captured image is divided into a plurality of areas. As illustrated in FIG. 20, the image 40 captured by the image capturing unit 11 is divided into a plurality of areas 400. In the present example, the image is divided into a total of 25 areas 400, five columns by five rows. Then, in each of the 25 areas 400, a representative point 41 is determined. In the present example, each representative point 41 is a pixel at the center of each area 400. Here, the representative point 41 is a reference point for detecting a motion vector. The representative point 41 is not limited to the pixel at the center of the area 400, and may be a point at an appropriate position in the area.

Next, for each of the determined representative points 41, a motion vector 42 is determined. Then, a center point of radial motion vectors 42 is defined as a vanishing point. Movement of a pixel having a brightness equal to that of the pixel of the representative point 41 in accordance with the travel of the vehicle is detected to determine a motion vector 42 in accordance with the travel of the vehicle. The direction and magnitude of the motion vector 42 can be detected in x-coordinates and y-coordinates by searching an area for pixels having a brightness closest to that of the pixel of the representative point 41.

FIG. 21 is a diagram illustrating motion vectors detected in the respective areas 400 of the image 40. In FIG. 20, the image 40 is divided into 25 areas 400 to detect the motion vector 42 in each area 400. However, in implementation, as illustrated on the right side of FIG. 21, each area 400 may be divided into, for example, 20 areas 401, defining a pixel at the center of each area 401 as a representative point, determining a motion vector for each area 401, averaging the motion vectors by 20 areas 401 to determine the motion vector in the area 400. However, in the following description, each area 400 has one representative point, for ease of description.

An optical flow representing the movement of surrounding objects radially expands in a travel direction. Accordingly, when an image in front of the vehicle is captured by the in-vehicle camera during traveling of the vehicle along a straight road, which is not an uphill road or downhill road and does not turn right or left, the motion vectors 42 expanding in radial directions from the vicinity of the center of the image 40 are detected as illustrated in FIG. 22. The magnitude of each motion vector changes in accordance with the traveling speed of the vehicle.

Note that the optical flow represents the movement of an object in the image 40 as vectors. In the present example, the center of the radial optical flow is defined as a vanishing point 20P.

(In Case of Headlight Including Plurality of Lamps)

When a right headlight and a left headlight include a plurality of lamps having optical axes differently directed, lamps to be turned on can be selected from the plurality of lamps to control a range of illumination.

Figure 23:
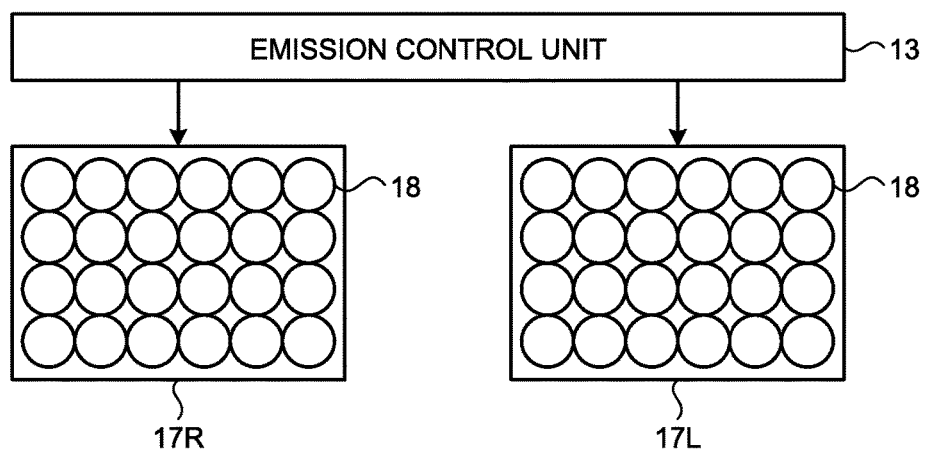
FIG. 23 is a diagram illustrating an exemplary configuration for controlling turning on and off of headlights each including a plurality of LED lamps by an emission control unit.

FIG. 23 is a diagram illustrating an exemplary configuration for controlling turning on and off of headlights each including a plurality of LED lamps by the emission control unit 13. As illustrated in FIG. 23, a right headlight 17R and a left headlight 17L each include a plurality of LED lamps 18.

In the present example, the right headlight 17R and the left headlight 17L each include a total of 24 LED lamps 18, four columns by six rows. The directions of the optical axes of the 24 LED lamps 18 are different from each other. For the right headlight 17R and the left headlight 17L, the emission control unit 13 selects LED lamps to be turned on, on the basis of a position of a vanishing point. The emission control unit 13 refers to the table 14B to determine LED lamps to be turned on. In the present example, the table 14B stored in the storage unit 14 associates a position of a vanishing point in an image 40 with LED lamps to be turned on. The emission control unit 13 refers to the table 14B to determine LED lamps to be turned on corresponding to the position of a vanishing point, from the plurality of LED lamps 18.

FIGS. 24 to 30 are diagrams illustrating LED lamps to be turned on for the right headlight 17R and the left headlight 17L. FIGS. 24 to 30 are diagrams each illustrating the right headlight 17R and the left headlight 17L as viewed from the front side of the vehicle. Since the vehicle is viewed from the front side in FIGS. 24 to 30, right and left are reversed in FIGS. 24 to 30. That is, in each diagram, the right headlight 17R is illustrated on the left side and the left headlight 17L is illustrated on the right side. Note that, in FIGS. 24 to 30, LED lamps to be turned on are represented by black circles and LED lamps not to be turned on (LED lamps to be turned off) are represented by white circles.

Figure 24:
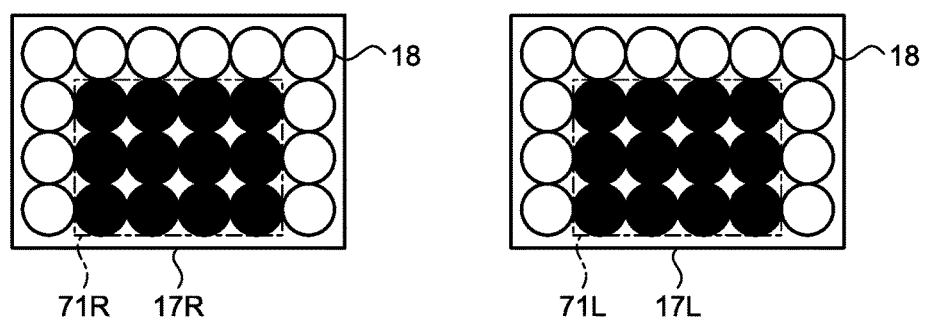
FIG. 24 is a diagram illustrating LED lamps to be turned on of a right headlight and a left headlight.

For example, to form the ranges of illumination described with reference to FIG. 4, in the right headlight 17R and the left headlight 17L, LED lamps of the plurality of LED lamps 18 positioned at both ends and upper ends are turned off, and 12 LED lamps positioned in ranges 71R and 71L located in the centers are turned on, as illustrated in FIG. 24. Turning on of the 12 LED lamps positioned in the ranges 71R and 71L allows emission of light to ranges equivalent to the ranges 51R and 51L of illumination described with reference to FIG. 4.

Figure 25:
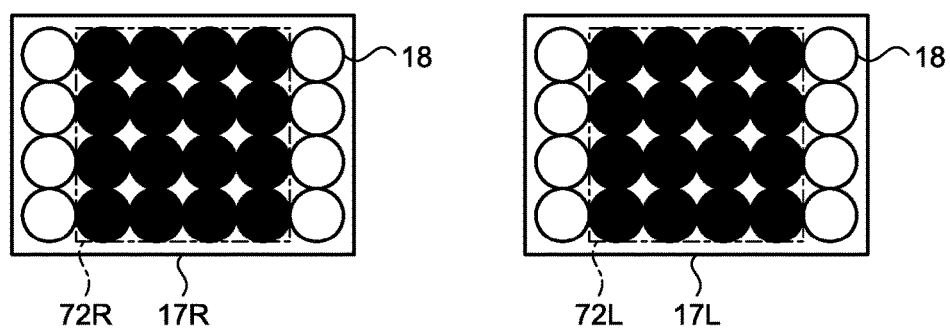
FIG. 25 is a diagram illustrating LED lamps to be turned on of the right headlight and the left headlight.

To form the ranges of illumination described with reference to FIG. 5, in the right headlight 17R and the left headlight 17L, LED lamps of the plurality of LED lamps 18 positioned at both ends are turned off, and 16 LED lamps positioned in ranges 72R and 72L located in the centers are turned on, as illustrated in FIG. 25. Unlike FIG. 24, LED lamps positioned at the upper end of the center of each headlight are also turned on. Thus, light is allowed to be emitted farther than light in FIG. 24. Turning on of the 16 LED lamps positioned in the ranges 72R and 72L allows emission of light to ranges equivalent to the ranges 51R and 51L of illumination described with reference to FIG. 5.

Figure 26:
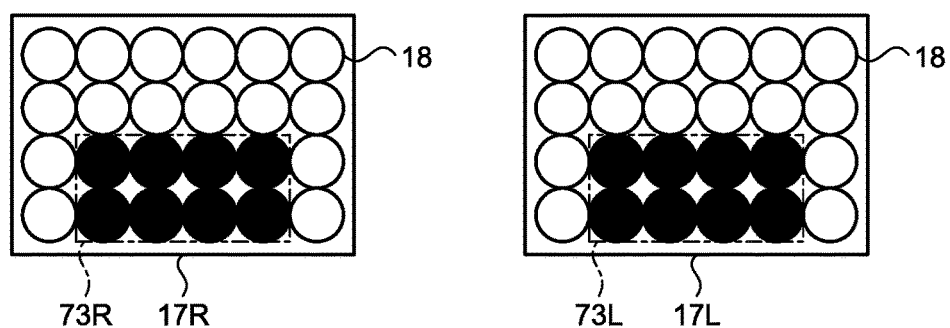
FIG. 26 is a diagram illustrating LED lamps to be turned on of the right headlight and the left headlight.

To form the range of illumination described with reference to FIG. 6, in the right headlight 17R and the left headlight 17L, LED lamps of the plurality of LED lamps 18 positioned at both ends are turned off, and eight LED lamps positioned in ranges 73R and 73L located in the lower halves of the centers are turned on, as illustrated in FIG. 26. Thus, light is allowed to be emitted closer than light in FIG. 24. Turning on of the eight LED lamps positioned in the ranges 73R and 73L allows emission of light to ranges equivalent to the ranges 51R and 51L of illumination described with reference to FIG. 6.

Figure 27:
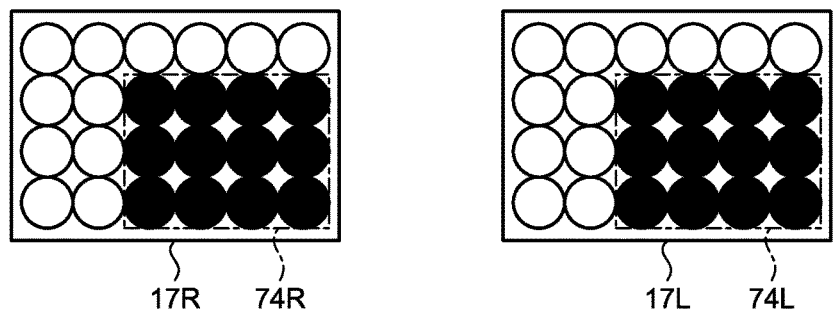
FIG. 27 is a diagram illustrating LED lamps to be turned on of the right headlight and the left headlight.

To form the range of illumination described with reference to FIG. 7, in the right headlight 17R and the left headlight 17L, 12 LED lamps of the plurality of LED lamps 18 positioned in ranges 74R and 74L located near lower left portions are turned on, as illustrated in FIG. 27. Thus, light is allowed to be emitted to the left side relative to light in FIG. 24. Turning on of the 12 LED lamps positioned in the ranges 74R and 74L allows emission of light to ranges equivalent to the ranges 51R and 51L of illumination described with reference to FIG. 7.

Figure 28:
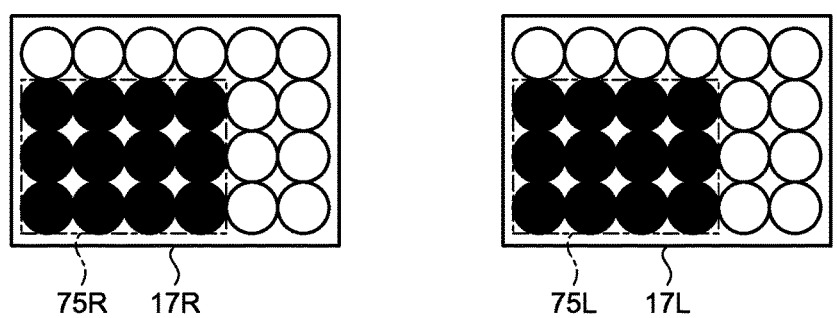
FIG. 28 is a diagram illustrating LED lamps to be turned on of the right headlight and the left headlight.

To form the range of illumination described with reference to FIG. 8, in the right headlight 17R and the left headlight 17L, 12 LED lamps of the plurality of LED lamps 18 positioned in ranges 75R and 75L located near lower right portions are turned on, as illustrated in FIG. 28. Thus, light is allowed to be emitted to the right side relative to light in FIG. 24. Turning on of the 12 LED lamps positioned in the ranges 75R and 75L allows emission of light to ranges equivalent to the ranges 51R and 51L of illumination described with reference to FIG. 8.

Figure 29:
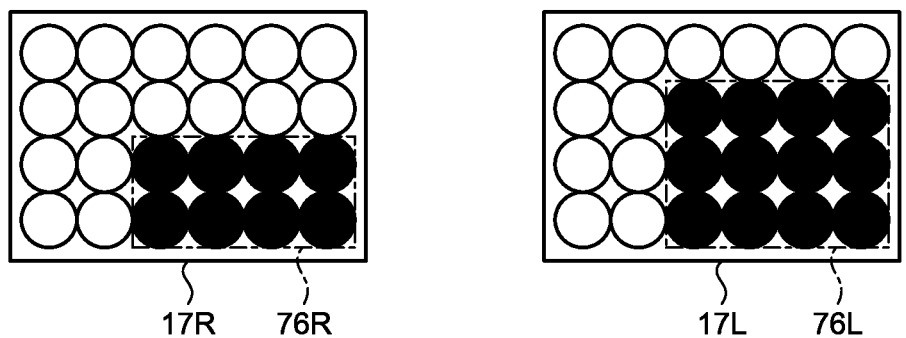
FIG. 29 is a diagram illustrating LED lamps to be turned on of the right headlight and the left headlight.

To form the range of illumination described with reference to FIG. 9, in the right headlight 17R, eight LED lamps of a plurality of LED lamps 18 positioned in a range 76R located near a lower left portion are turned on, and in the left headlight 17L, 12 LED lamps of the plurality of LED lamps positioned in a range 76L located near a lower left portion are turned on, as illustrated in FIG. 29. Thus, the range of illumination on the right side can be set to a lower position compared with the range of illumination on the right side illustrated in FIG. 24. Turning on of the LED lamps positioned in the ranges 76R and 76L allows emission of light to ranges equivalent to the ranges 51R and 51L of illumination described with reference to FIG. 9.

Figure 30:
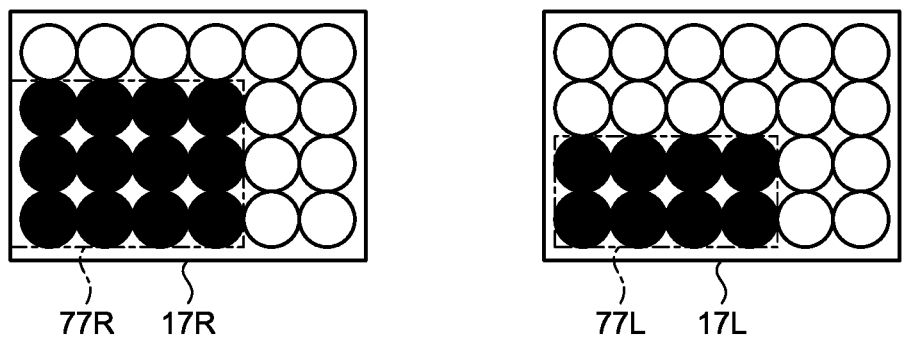
FIG. 30 is a diagram illustrating LED lamps to be turned on of the right headlight and the left headlight.

To form the range of illumination described with reference to FIG. 10, in the right headlight 17R, 12 LED lamps of the plurality of LED lamps 18 positioned in a range 77R located near a lower right portion are turned on, and in the left headlight 17L, eight LED lamps of the plurality of LED lamps positioned in a range 77L near a lower right portion are turned on, as illustrated in FIG. 30. Thus, the range of illumination on the left side can be set to a lower position compared with the range of illumination on the left side illustrated in FIG. 24. Turning on of the LED lamps positioned in the ranges 77R and 77L allows emission of light to ranges equivalent to the ranges 51R and 51L of illumination described with reference to FIG. 10.

(In Case of Headlight Using Laser Light)

When the headlight 12 has a laser light source, a range of illumination can be controlled by scanning laser light. Laser light has a diameter smaller than that of light of the LED lamp, and, in the present example, the laser light is scanned to increase the range of illumination. Thus, a range of illumination equal to that of a headlight including a lamp and a reflector can be formed.

Figure 31:
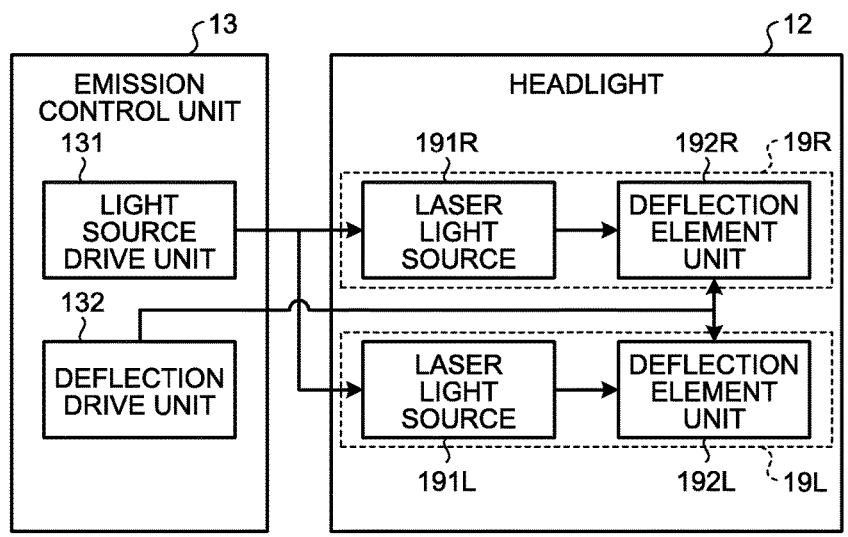
FIG. 31 is a diagram illustrating an example of a headlight having a laser light source and an emission control unit.

FIG. 31 is a diagram illustrating an example of a headlight 12 having a laser light source and an emission control unit 13. As illustrated in FIG. 31, the headlight 12 includes a right headlight 19R and a left headlight 19L. The right headlight 19R according to the present example includes a laser light source 191R and a deflection element unit 192R. Furthermore, the left headlight 19L according to the present example includes a laser light source 191L and a deflection element unit 192L. The laser light sources 191R and 191L output laser light. The deflection element unit 192R includes a mirror for reflecting laser light output from the laser light source 191R to change the laser light emitting position. The deflection element unit 192L includes a mirror for reflecting laser light output from the laser light source 191L to change the laser light emitting position.

The emission control unit 13 includes a light source drive unit 131 and a deflection drive unit 132. The light source drive unit 131 drives the laser light sources 191R and 191L. The deflection drive unit 132 controls the deflection element unit 192R of the right headlight 19R and the deflection element unit 192L of the left headlight 19L.

The deflection drive unit 132 rotatably and swingably drives the mirror of the deflection element unit 192R to scan a light emitting position of the laser light source 191R. Furthermore, the deflection drive unit 132 drives the mirror of the deflection element unit 192L to scan a light emitting position of the laser light source 191L.

Note that the table 14B associates a position of a vanishing point with data representing a range in which a laser light source is turned on.

Next, operation of the headlight 12 is described. The deflection drive unit 132 operates the deflection element unit 192R and the deflection element unit 192L to scan the light emitting positions of the laser light sources 191R and 191L. During scanning the light emitting position by the deflection drive unit 132, the light source drive unit 131 turns on or off the laser light sources 191R and 191L.

The emission control unit 13 refers to the table 14B to obtain data representing a range in which a laser light source is turned on, on the basis of data relating to the position of a vanishing point, turning on or off the laser light sources 191R and 191L.

(Example of Scanning Laser Light)

FIGS. 32 to 35 are diagrams illustrating ranges of illumination formed by scanning laser light. Here, ranges of illumination from the right headlight 19R are described.

Figure 32:
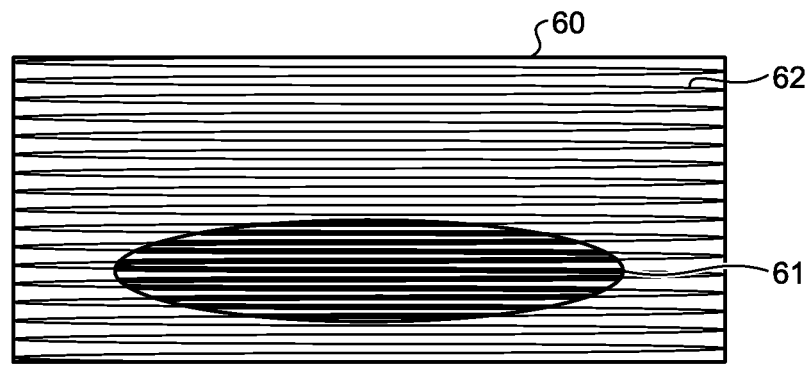
FIG. 32 is a diagram illustrating a relationship between a scanning trajectory of laser light and a range of illumination with laser light.

FIG. 32 is a diagram illustrating a relationship between a scanning range and a scanning trajectory 62 of laser light and a range of illumination with laser light. As illustrated in FIG. 32, the scanning trajectory 62 of laser light is formed by the deflection element unit 192R. To form a range of illumination described with reference to FIG. 4, in a scanning range 60 illustrated in FIG. 32, the laser light source 191R is turned on in a range 61 of illumination (portion represented by a thick line in the figure) to output light. Furthermore, in the scanning range 60 illustrated in FIG. 32, the laser light source 191R is turned off outside the range 61 of illumination.

Figure 33:
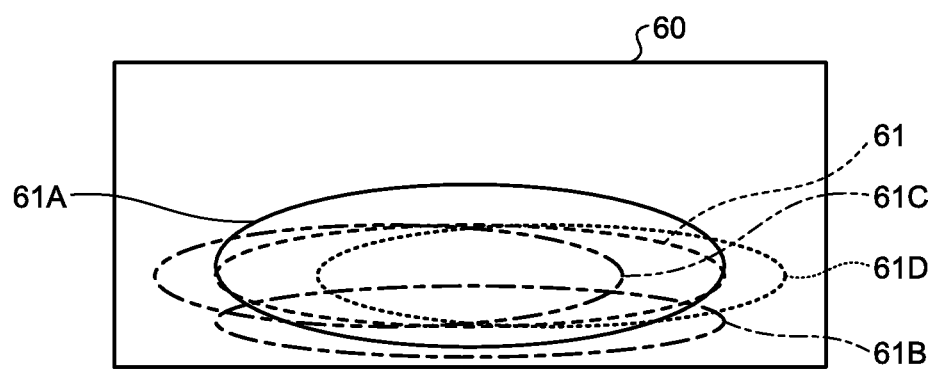
FIG. 33 is a diagram illustrating comparison between the ranges of illumination with laser for forming the respective ranges of illumination described with reference to FIGS. 5 to 8.

FIG. 33 is a diagram illustrating comparison between ranges of illumination with laser for forming the respective ranges of illumination described with reference to FIGS. 5 to 8. To form the range of illumination described with reference to FIG. 5, in the scanning range 60, the laser light source 191R is turned on in a range 61A of illumination, and the laser light source 191R is turned off outside the range 61A of illumination, as illustrated in FIG. 33. Thus, the range 61A of illumination which is larger in a vertical direction can be formed including the range 61 of illumination.

To form the range of illumination described with reference to FIG. 6, in the scanning range 60, during scanning a laser light emitting position, the laser light source 191R is turned on in a range 61B of illumination, and the laser light source 191R is turned off outside the range 61B of illumination, as illustrated in FIG. 33. Thus, the range 61B of illumination which is smaller in a vertical direction can be formed below the range 61 of illumination.

To form the range of illumination described with reference to FIG. 7, in the scanning range 60, during scanning a laser light emitting position, the laser light source 191R is turned on in a range 61C of illumination, and the laser light source 191R is turned off outside the range 61C of illumination, as illustrated in FIG. 33. Thus, the range 61C of illumination which is on the left side can be formed, having a size equal to that of the range 61 of illumination.

To form the range of illumination described with reference to FIG. 8, in the scanning range 60, during scanning a laser light emitting position, the laser light source 191R is turned on in a range 61D of illumination, and the laser light source 191R is turned off outside the range 61D of illumination, as illustrated in FIG. 33. Thus, the range 61D of illumination which is on the right side can be formed, having a size equal to that of the range 61 of illumination.

Use of a laser light source also enables forming the ranges of illumination described with reference to FIGS. 9 and 10. In each case, during scanning a laser light emitting position, the laser light source 191R is turned on in a range of illumination, and the laser light source 191R is turned off outside the range of illumination.

Furthermore, when a laser light source is used, a specific object can be removed from a range of illumination to avoid emitting light to the object. For example, an object such as a pedestrian or an oncoming car is removed, as an object to which no light is emitted, from a range of illumination. The control unit 15 performs image processing on an image captured by the in-vehicle camera to detect the object to which no light is emitted. For example, a pedestrian or an oncoming car can be detected using pattern recognition. The light source drive unit 131 turns off the laser light source 191R in a predetermined range including the detected object.

Figure 34:
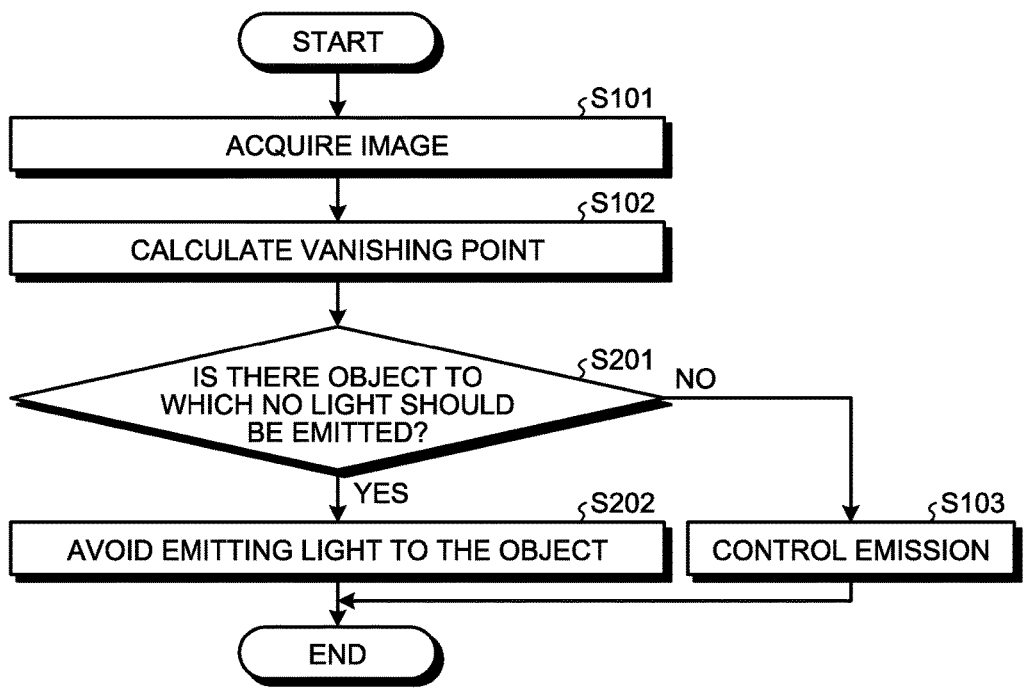
FIG. 34 is a flowchart illustrating an example of a headlight controlling method for removing a specific object from a range of illumination to avoid emitting light to the object.

FIG. 34 is a flowchart illustrating an example of a headlight controlling method for removing a specific object from a range of illumination to avoid emitting light to the object. The process of FIG. 34 is performed on condition that the headlight is turned on.

In FIG. 34, the process of Steps S101 and S102 is performed as described above with reference to FIG. 2.

After a vanishing point is calculated in Step S102, it is determined whether there is an object to which no light should be emitted (Step S201). In Step S201, when it is determined that there is the object to which no light should be emitted (Yes in Step S201), emission of light from the headlight is controlled to avoid emitting light to the object, on the basis of the calculated position of a vanishing point (Step S202).

In Step S201, when it is determined that there is no object to which no light should be emitted (No in Step S201), emission of light from the headlight is controlled on the basis of the calculated position of a vanishing point, as in the case of FIG. 2 (Step S103).

Figure 35:
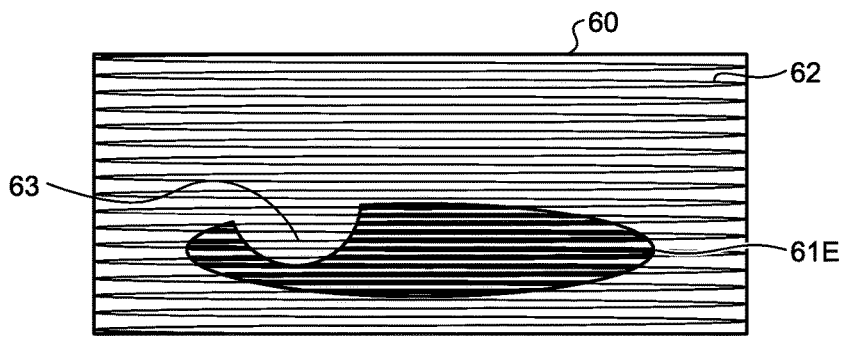
FIG. 35 is a diagram illustrating an example of a range of illumination formed by scanning laser light, excluding a specific object from the range of illumination.

FIG. 35 is a diagram illustrating an example of a range of illumination formed by scanning laser light, excluding a specific object from the range of illumination. In FIG. 35, as a result of detection of an object to which no light is emitted, a range 61E of illumination has a missing portion 63. During scanning a laser light emitting position as represented by a scanning trajectory 62 in FIG. 35, the laser light source 191R is turned on in the range 61E of illumination (portion represented by a thick line in the figure), and the laser light source 191R is turned off outside the range 61E of illumination, forming the range 61E of illumination. In the range 61E of illumination, a range in which the laser light source 191R is turned off may be set inside the range 61E of illumination.

The range of illumination from the right headlight 19R has been described above, but the same is applied to a range of illumination from the left headlight 19L.

(Control According to Traveling Speed)

Figure 36:
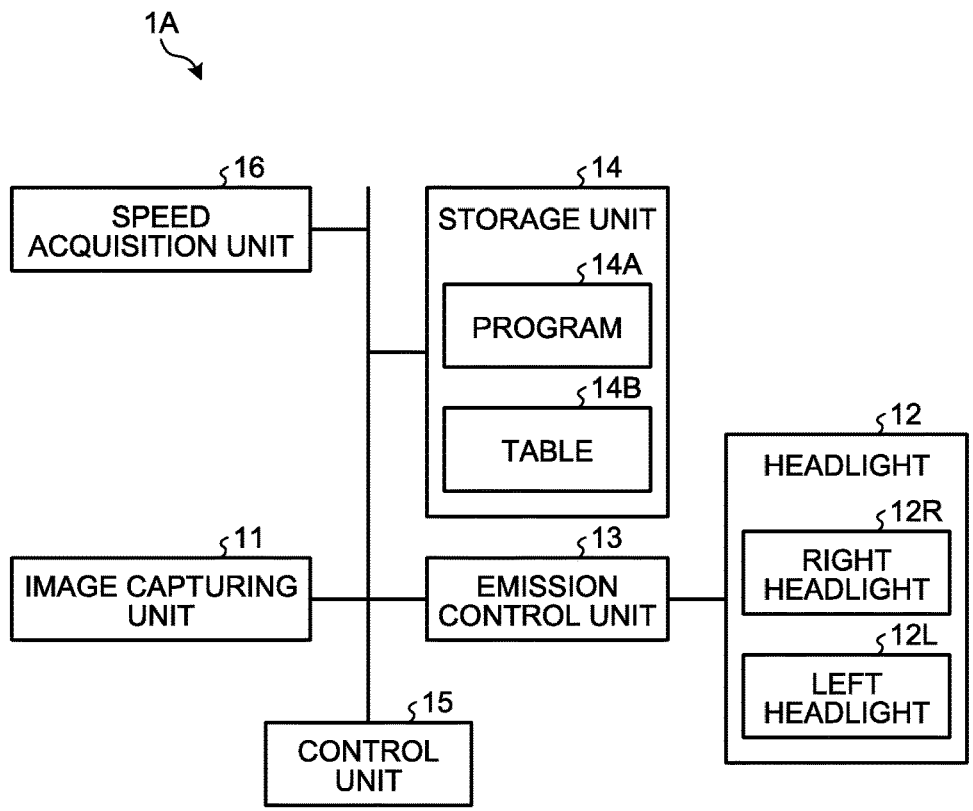
FIG. 36 is a diagram illustrating an example of a headlight device for setting a control cycle of an emission control unit in accordance with the speed of a vehicle.

The emission control unit 13 may change a control cycle in accordance with the speed of the vehicle. Such a change in control cycle as described above enables appropriate control of the speed of the vehicle. FIG. 36 is a diagram illustrating an example of a headlight device for setting a control cycle of the emission control unit 13 in accordance with the speed of the vehicle. As illustrated in FIG. 36, a headlight device 1A according to the present example includes a speed acquisition unit 16. The speed acquisition unit 16 acquires a traveling speed of the vehicle. The emission control unit 13 determines a cycle of controlling the headlight 12 in accordance with the acquired traveling speed.

Figure 37:
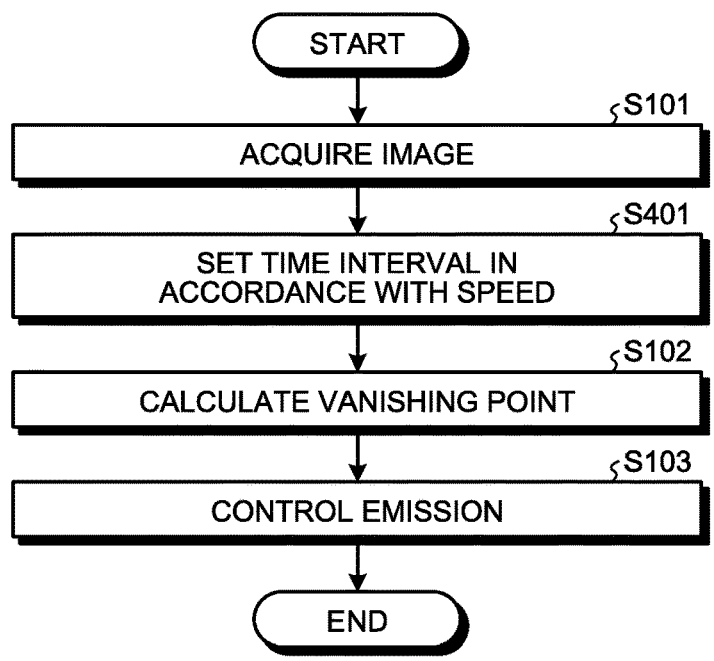
FIG. 37 is a flowchart illustrating exemplary operation of the headlight device illustrated in FIG. 36.

FIG. 37 is a flowchart illustrating exemplary operation of the headlight device 1A illustrated in FIG. 36. The process of FIG. 37 is performed on condition that the headlight is turned on. As illustrated in FIG. 37, in the headlight device 1A according to the present example, the control unit 15 acquires an image while the headlight is turned on (Step S101). The emission control unit 13 sets a time interval in accordance with the traveling speed acquired by the speed acquisition unit 16 (Step S401). After elapse of the time interval set in Step S401, the emission control unit 13 calculates a vanishing point as described above (Step S102), and controls the emission of light on the basis of a calculated position of a vanishing point (Step S103).

The emission control unit 13 performs the above process continuously when the headlight is turned on. Accordingly, when the traveling speed is changed, the time interval set by the emission control unit 13 in Step S401 is changed. Therefore, emission of light from the headlight 12 can be controlled at an appropriate frequency associated with the traveling speed. For example, for a high traveling speed (e.g., during traveling on an expressway), the time interval set by the emission control unit 13 in Step S401 is reduced to increase the frequency of control, and for a low traveling speed (e.g., during traveling on an ordinary road other than the expressway at a low speed or during parking), the time interval set by the emission control unit 13 in Step S401 is increased to reduce the frequency of control. As described above, the frequency of control performed by the emission control unit 13 can be changed in accordance with the traveling speed of the vehicle to control the emission of light without providing an uncomfortable feeling to a driver.

MODIFICATIONS

An image captured by the image capturing unit 11 has a portion having high brightness and a portion having low brightness. The emission control unit 13 may control the direction of light emission so that the position of the portion having high brightness coincides with the position of a vanishing point. In this configuration, the emission control unit 13 changes the direction of light emission so that the position of the portion having high brightness moves in accordance with a change in position of a vanishing point.

Depending on a state of a road on which the vehicle travels, no vanishing point may be calculated. When no vanishing point is calculated, the emission control unit 13 controls emission of light from the headlight 12 to illuminate a predetermined position (default position). The default position is set, for example, at the factory before shipment of the headlight device 1.

CONCLUSION

As described above, emission of light from the headlight is controlled during travel of the vehicle on the basis of a position of a vanishing point, and light can be emitted to an appropriate position of a field of view which the driver actually views while driving the vehicle.

According to the present disclosure, emission of light from a headlight can be appropriately controlled in a traveling vehicle.

What is claimed is:

1. A headlight device comprising:
an image capturing unit configured to capture an image in a traveling direction of a traveling vehicle;
a vanishing point calculation unit configured to calculate, based on an image captured by the image capturing unit, a position of a vanishing point in the image,
a pair of headlights provided on a left side and a right side of a front portion of the vehicle and configured to emit light in a traveling direction of the vehicle; and
an emission control unit configured to control emission of light from the headlights such that lights from the pair of headlights are emitted to overlap each other at a position of the vanishing point based on the position of the vanishing point calculated by the vanishing point calculation unit and a height of a range of illumination from a headlight, of the pair of headlights, positioned on an opposite side from the position of the vanishing point with respect to a horizontal center in the image is decreased.

2. The headlight device according to claim 1, wherein
each of the headlights includes a change/drive unit configured to change a direction of an optical axis, and
the emission control unit controls the change/drive unit such that lights from the pair of headlights are emitted to overlap each other at the position of a vanishing point and the headlights are directed to an optical axis in which the height of the range of illumination from the headlight positioned on the opposite side from the position of the vanishing point with respect to the horizontal center in the image is decreased.

3. The headlight device according to claim 1, wherein
each of the headlights includes a plurality of light sources having optical axes differently directed, and
the emission control unit controls selection of light sources from the plurality of light sources such that lights from the pair of headlights are emitted to overlap each other at the position of the vanishing point and the height of the range of illumination from the headlight positioned on the opposite side from the position of the vanishing point with respect to the horizontal center in the image is decreased.

4. The headlight device according to claim 1, wherein
each of the headlights is configured to scan light emitted from a light source to emit light, and
the emission control unit controls turning on or off of the light source in accordance with the scanning such that lights from the pair of headlights are emitted to overlap each other at the position of a vanishing point and the height of the range of illumination from the headlight positioned on the opposite side from the position of the vanishing point with respect to the horizontal center in the image is decreased.

5. The headlight device according to claim 1, wherein
the emission control unit restricts a range of illumination from the headlights to a predetermined range.

6. The headlight device according to claim 1, further comprising
a speed detection unit configured to detect a traveling speed of the vehicle,
wherein calculating the position of the vanishing point by the vanishing point calculation unit and controlling emission of light from the headlights by the emission control unit are performed at a frequency associated with the traveling speed detected by the speed detection unit.

7. The headlight device according to claim 1, wherein
the vanishing point calculation unit calculates the position of the vanishing point based on a road mark or an installation provided on a road on which the vehicle travels, the road mark and the installation being included in the image.

8. A headlight controlling method comprising steps of:
emitting light in a traveling direction of a traveling vehicle;
capturing an image in the traveling direction of the vehicle;
calculating, based on the captured image, a position of a vanishing point in the image; and
controlling emission of light from a pair of headlights such that lights from the pair of headlights provided on a left side and a right side of a front portion of the vehicle are emitted to overlap each other at the position of the vanishing point based on the position of the vanishing point and a height of a range of illumination from a headlight, of the pair of headlights, positioned on an opposite side from the position of the vanishing point with respect to a horizontal center in the image is decreased.

9. A non-transitory storage medium storing therein a headlight controlling program causing a computer to achieve:
a function of capturing an image in a traveling direction of a traveling vehicle;
a function of calculating, on the basis of the captured image, a position of a vanishing point in the image; and
a function of controlling emission of light from a pair of headlights such that lights from the pair of headlights provided on a left side and a right side of a front portion of the vehicle are emitted to overlap each other at the position of the vanishing point based on the calculated position of the vanishing point and a height of a range of illumination from a headlight, of the pair of headlights, positioned on an opposite side from the position of the vanishing point with respect to a horizontal center in the image is decreased.

* * * * *